2,910,441

DISPERSING AGENTS AND DISPERSIONS PRODUCED THEREWITH

Rudi Heyden, Dusseldorf, Germany, assignor to Bohme Fettchemie G.m.b.H., Dusseldorf, Germany, a corporation of Germany No Drawing. Application November 2, 1954
Serial No. 466,459

2 Claims. (Cl. 252—312)

This invention relates to dispersing agents and dispersions produced with the aid of such agents, and more particularly to dispersing agents composed of condensation products of polyalkyleneoxide waxes, organic oxo-compounds, and derivatives of high-molecular aliphatic compounds.

The use of high-molecular condensation products as dispersing or emulsifying agents is well known in industry. However, the dispersing agents known to the art and heretofore commonly employed to prepare dispersions and emulsions, have not been entirely satisfactory in that emulsions formed therewith are unstable under conditions of storage, particularly where the emulsion contains anion-active, cation-active or neutral electrolytes.

It is therefore an object of this invention to provide dispersing or emulsifying agents for the preparation of highly stable dispersions.

Another object of this invention is to provide dispersing or emulsifying agents for the preparation of dispersions which are stable in the presence of anion-active, cation-active or neutral electrolytes.

Other objects and advantages of this invention will become apparent as the description thereof proceeds.

I have found that very stable dispersions of dispersible liquid or solid substances can be produced, and that such dispersions or emulsions are highly resistant against decomposition due to the action of electrolytes present in such emulsions, if the dispersing or emulsifying agent used to prepare the emulsion contains condensation products of polyalkyleneoxide waxes, oxo-compounds and high-molecular aliphatic, cycloaliphatic, aliphatic-aromatic or aliphatic-cycloaliphatic compounds which contain a replaceable hydrogen atom linked to the molecule through an oxygen, sulfur or nitrogen atom.

While the term "polyalkyleneoxide waxes" ordinarily embraces primarily polyethyleneglycols having a molecular weight between 500 and 10,000, its meaning within the scope of the present disclosure also includes polyethyleneglycols having higher or lower molecular weights. However, for the purpose of my invention, the corresponding polymerization products of other alkyleneoxides, such as, for example, propyleneoxide, epichlorohydrin and the like, may also be used.

The term "oxo-compounds" is intended to include primarily formaldehyde and formaldehyde-yielding compounds, such as paraformaldehyde, trioxymethylene, hexamethyltetramine, methylal and the like, as well as acetaldehyde, crotonaldehyde, benzaldehyde, acetone, acetophenone, cyclohexanone and the like.

The higher molecular aliphatic, cycloaliphatic, aliphatic-cycloaliphatic or aliphatic-aromatic compounds which contain a replaceable hydrogen atom linked to the molecule through an oxygen, sulfur, or nitrogen atom, above referred to, are intended to include, primarily, high-molecular alcohols, alkylphenols, mercaptans, and amines, high-molecular carboxylic acid amides, and sulfonic acid amides. Most advantageous for the formation of the condensation products in accordance with my invention are those high-molecular compounds in which the basic hydrocarbon radicals contain at least six carbon atoms, that is, compounds which are principally of a fatty nature. The basic hydrocarbon radicals may also carry substituents or they may be interrupted by oxygen, sulfur or nitrogen atoms, or heteroatom groups derived therefrom.

The higher molecular aliphatic, cycloaliphatic, aliphatic-aromatic and aliphatic-cycloaliphatic compounds referred to in the preceding paragraph include, for example, hexylalcohol, octylalcohol, decylmercaptan, dodecylamine, cyclohexylalcohol, methylcyclohexylamine, naphthenealcohols, benzylalcohol, ar-tetralol, naphthenic acid amides, oleic acid amide, lauric acid amide, alkylbenzene sulfonic acid amides, wherein the alkyl radicals contain 3 to 18 carbon atoms, and the like.

The amounts in which the three types of components mentioned above are employed in the production of dispersing agents in accordance with my invention depend upon the type of condensation product desired. Thus, an excellent dispersing agent which forms a stable dispersion can be produced by condensing two mols of an oxo-compound and two mols of a fatty component with one mol of a polyalkyleneoxide wax. However, the molar ratio of reactants may also be selected in such a manner that a relatively large number of mols of an oxo-compound is caused to be combined with several mols of polyalkyleneoxide wax. Thus, for example, another very effective and stable dispersing agent can be formed by condensing a polyalkyleneoxide wax, an oxo-compound and a fatty compound in a molar ratio of 2:3:2. In this respect, the molar ratio can be varied as desired, depending upon whether one or more polyalkylene-oxide wax radicals are desired to be introduced into the molecule of the condensation product. In general, I have found that condensation products of polyalkyleneoxide waxes, oxo-compounds and fatty compounds whose molecular weight is greater than 2000 are especially effective dispersing agents.

As a rule, the dispersing agents in accordance with my invention are produced in such a manner that all of the starting components for the condensation reaction are condensed together in the presence of an acid catalyst, such as, for example, ferric chloride or aluminum chloride, and in the presence of an inert solvent, such as, for example, toluene or xylene, while continuously removing the water formed by the condensation reaction, for example as described in United States Patent No. 2,609,344. However, the dispersing agents of my invention may also be formed by first partially condensing the polyalkyleneoxide wax component with the fatty component, and subsequently further condensing this preliminary condensation product with the oxo-compound component, as well as with additional amounts of polyalkyleneoxide wax and/or fatty component, if desired. Thus, for example, a preliminary condensation product can be formed by condensing a fatty component, that is, a high-molecular organic compound which contains a replaceable hydrogen atom linked with the molecule through an oxygen, sulfur or nitrogen atom, with ethylene oxide until a molecular weight of at least 1500 is reached and subsequently further condensing this preliminary condensation product with the oxo-compound and/or additional mols of polyalkyleneoxide wax and/or fatty component until the desired condensation product is formed.

Liquid or solid substances which are capable of being dispersed or emulsified with the aid of the dispersing agents in accordance with my invention are primarily mineral, animal, vegetable or synthetic oils, fats or waxes, natural or synthetic resin oil or resins, natural or synthetic rubber, albumins, synthetic high-polymeric compounds, such as polyvinyl compounds, polyesters, polyamides, and the like, as well as inorganic or organic pigments such as color pigments, delustering agents, weighting agents, fillers, salts and solid, powdery substances of all types.

The condensation products disclosed herein may be used as dispersing agents in accordance with my invention either alone or in conjunction with other dispersing or emulsifying agents, such as, for example those heretofore commonly used, that is anion-active dispersants such as alkylsulfates, alkylsulfonates, sulfonated oils and fats or fatty acid esters, organic disulfonic or sulfonic carbonimides, soap and the like, cation-active dispersing agents such as the well known quaternary ammonium compounds or onium compounds of analogous structure derived from phosphorus or sulfur, nonionic dispersing agents such as addition products of ethyleneoxide and high-molecular alcohols, and the like.

The following examples will serve to further illustrate my invention and enable persons skilled in the art to understand my invention more completely. However, it is understood that the invention is not limited to the particular quantities, compounds or conditions recited in these examples.

*Example I*

2 parts by weight of a mixture of sodium alkylsulfates, having alkyl radicals containing 12 to 18 carbon atoms, and 5 parts by weight of a condensation product produced by condensing together stearyl alcohol, paraformaldehyde and polyethyleneoxide having a molecular weight of about 9000, in a molar ratio of 2:2:1, were dissolve in 53 parts by weight of water while warming the solution. A viscous solution was formed to which 40 parts by weight of filtered sperm oil were added, accompanied by vigorous stirring. The resulting mass was a thick, homogeneous emulsion which was stable over a practically indefinite period of time. This emulsion did not decompose or break down when diluted with water or solutions of electrolytes, such as solutions of common salt, magnesium sulfate, sulfuric acid, acetic acid and the like.

*Example II*

2 parts by weight of an addition product, obtained from 1 mol of oleylalcohol and 12 mols of ethyleneoxide, and 5 parts by weight of a condensation product produced by condensing together oleylalcohol, paraformaldehyde and polyethyleneoxide having a molecular weight of about 4000, in a molar ratio of 2:3:2, were dissolved in 53 parts by weight of water. To this solution 40 parts by weight of paraffin oil were added, accompanied by vigorous stirring. The resulting mass was a viscous, homogeneous emulsion which remained stable for extended periods of time, even in the presence of electrolytes, which were subsequently added thereto.

*Example III*

15 parts by weight of a condensation product produced by condensing together stearyl alcohol, paraformaldehyde and polyethyleneoxide, having a molecular weight of about 7500, in a molar ratio of 2:2:1 in the manner described above, were dissolved in 47.5 parts by weight of water. Thereafter, 28 parts by weight of chloroparaffin were added to this solution, and then 2.5 parts by weight of dekalin and 7.0 parts by weight of finely pulverized chromium oxide were admixed with the mixture. The entire mass was vigorously stirred. The resulting mass was a homogeneous dispersion which was highly stable, even in the presence of an electrolyte solution with which portions thereof were diluted.

*Example IV*

5 parts by weight of a condensation product produced by condensing together a polyethyleneoxide wax having a molecular weight of about 9300, paraformaldehyde and stearic acid amide in a molar ratio of 1:2:2 were dissolved in 95 parts by weight of sulfonated sperm oil neutralized with ammonia (total fat content about 75%). When diluted with water and thorouhgly stirred this solution forms a homogeneous emulsion which is highly stable in the presence of electrolytes. Such emulsions may be advantageously used for fat liquoring of leather. When a suitable chrominum salt is added, emulsions prepared in the above manner are suitable for simultaneous fatting and chromium tanning of skins and pelts.

While I have disclosed certain specific embodiments of my invention, I wish it to be understood that the invention is not limited to such embodiments and that changes and modifications can be made without departing from the spirit thereof or the scope of the following claims.

I claim:

1. An aqueous emulsion stable when diluted with aqueous electrolyte solutions comprising about 2 parts of a mixture of sodium alkyl sulfates containing 12 to 18 carbon atoms, about 40 parts of a natural fatty oil, about 53 parts of water and about 5 parts of a condensate formed by condensing stearyl alcohol, paraformaldehyde and polyethylene oxide having a molecular weight of about 9000, in a molar ratio of about 2:2:1.

2. An aqueous emulsion stable when diluted with aqueous electrolyte solutions comprising about 2 parts of a mixture of sodium alkyl sulfates containing 12 to 18 carbon atoms, about 40 parts of a natural fatty oil, about 53 parts of water and about 5 parts of a condensate formed by condensing stearyl alcohol, paraformaldehyde and polyethylene oxide having a molecular weight from about 4000 to about 9300, in a molar ratio of about 2:2:1.

References Cited in the file of this patent

UNITED STATES PATENTS

| | | |
|---|---|---|
| 1,970,578 | Schoeller et al. | Aug. 21, 1934 |
| 2,395,265 | Gresham | Feb. 19, 1946 |
| 2,609,344 | Johnson | Sept. 2, 1952 |